(12) United States Patent
Guthrie et al.

(10) Patent No.: US 6,175,888 B1
(45) Date of Patent: Jan. 16, 2001

(54) DUAL HOST BRIDGE WITH PEER TO PEER SUPPORT

(75) Inventors: Guy Lynn Guthrie, Austin, TX (US); Richard Allen Kelley, Apex, NC (US); Danny Marvin Neal, Round Rock; Steven Mark Thurber, Austin, both of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 08/627,810

(22) Filed: Apr. 10, 1996

(51) Int. Cl.[7] .................................................. G06F 13/14
(52) U.S. Cl. .............................................................. 710/129
(58) Field of Search ..................................... 395/281, 306, 395/308, 309, 310; 710/101, 126, 128, 129, 130

(56) References Cited

U.S. PATENT DOCUMENTS

| | | | |
|---|---|---|---|
| 5,566,345 | * 10/1996 | Ostrowski | 395/822 |
| 5,574,869 | * 11/1996 | Young et al. | 395/306 |
| 5,594,873 | * 1/1997 | Garrett | 395/281 |
| 5,621,902 | * 4/1997 | Cases et al. | 395/309 |
| 5,632,021 | * 5/1997 | Jennings et al. | 395/309 |
| 5,859,988 | * 1/1999 | Ajanovic et al. | 710/129 |

FOREIGN PATENT DOCUMENTS

| | | |
|---|---|---|
| 575042A1 | 12/1993 | (EP) . |
| 97/02533 | 1/1997 | (WO) . |

\* cited by examiner

Primary Examiner—Glenn A. Auve
(74) Attorney, Agent, or Firm—Mark E. McBurney (57) ABSTRACT

A data processing system includes a processor, system memory and a number of peripheral devices, and one or more bridges which may connect between the processor, memory and peripheral devices and other hosts or peripheral devices such as in a network. A bridge, such as a PCI host bridge, connects between a primary bus (e.g system bus) and a secondary bus. The host bridge provides a dual host bridge function which creates two secondary bus interfaces. This allows increased loading capability under one dual host bridge compared to a lesser number of slots allowed under one normal host bridge. Also included is additional control logic for providing arbitration control and for steering transactions to the appropriate bus interface. Additionally, peer to peer support across the two secondary bus interfaces in provided.

18 Claims, 5 Drawing Sheets

Definitions:

INBOUND = Towards the host Processor/s
OUTBOUND = Away from the host Processor/s
PMW = Posted Memory Write
RRQ = Read Request
IOWR = I/O Write
RRP = Read Reply
DMA DATA = DMA Write Data
DMA Read = DMA Read Request

DUAL HOST BRIDGE WITH PEER TO PEER SUPPORT

CROSS REFERENCE TO RELATED APPLICATIONS

U.S. patent application entitled "DATA PROCESSING SYSTEM INCLUDING BUFFERING MECHANISM FOR INBOUND AND OUTBOUND READS AND POSTED WRITES", filed Jun. 7, 1995, Ser. No. 08/472,603, now issued as U.S. Pat. No. 5,694,556 and assigned to the assignee of the present invention.

U.S. patent application entitled "METHOD AND APPARATUS FOR CONFIGURING PCI BRIDGES ON MULTIPLE PCI BUSES ENVIRONMENT", filed May 28, 1993, Ser. No. 08/070,134, now issued as U.S. Pat. No. 5,542,055 and assigned to the assignee of the present invention.

U.S. patent application entitled "SYSTEM AND METHOD FOR ENHANCEMENT OF SYSTEM BUS TO MEZZANINE BUS TRANSACTIONS, filed Nov. 2, 1995, Ser. No. 08/552,034, now issued as U.S. Pat. No. 5,673,399 and assigned to the assignee of the present invention.

BACKGROUND OF THE INVENTION

1. Field of the Invention

The present invention relates to data processing systems, and more particularly to data processing systems including mechanisms for efficiently providing the functional capability of a host bridge while also providing dual (two) bus interfaces for a secondary bus, such as a Peripheral Component Interconnect (PCI) bus, or the like.

2. Description of Related Art

Many standard bus architectures for use in data processing systems such as the Peripheral Component Interconnect (PCI) bus specification contain ordering rules for transactions that traverse a bus to bus bridge, which connects at least two buses having the same bus protocol. Examples of such transactions are read requests outbound from a host processor to a peripheral device, read replies (responsive to the read requests) containing the data from the peripheral device inbound to the host processor or posted writes in which a write command is posted to a buffer in a bus to bus bridge allowing the host to proceed with other processing. A posted write herein means that the write has completed on the initiating bus and is posted in the host bridge for future completion on the destination bus. Current bus to bus bridge architectures either require write buffers in both outbound (away from the host processor) and inbound (towards the host processor) direction to be flushed out prior to completing a read transaction that traverses the bus to bus bridge, or define specific bus to bus ordering rules such as set forth in the PCI Local Bus Specification, version 2.1, for the PCI bus architecture. The requirement to flush the buffers can create a performance problem for a busy server by holding up the processor read accesses which are retried if there are any posted writes in the bridge buffers. Retry herein means that the target device being addressed by the master acknowledges the access but signals that it is busy and it terminates the transaction. The master then tries the access again at a later time.

Also current bus to bus bridge architectures usually provide one primary interface and one secondary interface. The PCI bus architecture results in limited bus loading capability of only ten (10) bus loads. One soldered device (adapter) counts as one load, and a slotted adapter counts as two loads. As a result, a PCI host bridge can have only a maximum of 4 slots directly attached to its secondary bus. If fewer slots are attached, then more soldered devices can be attached. The host bridge also counts as one of the 10 loads on the secondary bus. This results in a need within a system that requires many slots, to either provide multiple host bridges, or to provide multiple PCI—PCI bridges, or a combination of both to generate the needed slots.

A bus to bus bridge which connects one PCI bus to another PCI bus is herein referred to as a PCI—PCI bridge. Ordering rules for transactions that traverse a PCI—PCI bridge are included in the PCI local Bus Specification, revision 2.1. A bridge which connects a host processor(s), system bus or other system interconnection to a PCI bus is referred to herein as a PCI Host bridge (PHB), or host bridge.

Host Bridges have unique requirements above that required of PCI—PCI bridges, but also do not have all of the same constraints as a PCI—PCI bridge since for a host bridge, the source of most transactions on the primary (system) side of the host bridge interface are initiated by a host processor(s) rather than an I/O Device.

An article in the IBM Technical Disclosure Bulletin dated July, 1992, at page 233 and entitled "Architecture for High Performance Transparent Bridges," shows architecture for high performance bridges with multi-port bridges interconnecting networks including buffering components which guarantee transfer of data whether read or write with uniform handling inside the bridge.

Although the article generally relates to improvement in performance of bridges, the article does not address the problem of bus loading restrictions and ways to alleviate these restrictions.

U.S. Pat. No. 5,333,269 entitled "Mechanism for Transferring Messages Between Source and Destination Users Through a Shared Memory," teaches a common bus to which a memory with a number of independent buffers, a memory interface and a central control unit are connected. The memory interface receives messages from source users, stores the message in selected buffers, and chains the buffers together. The control apparatus generates inbound message cues and outbound message cues in response to commands which it receives from the memory interface.

Although the patent has some similarities to high performance bus bridge architectures, the patent does not address nor suggest a solution to the problem of limited bus loading capabilities.

U.S. Pat. No. 5,247,620 entitled "Bridge Apparatus with an Address Check Circuit for Interconnecting Networks," teaches multiple inbound and outbound buffers for reading out information from processor to peripheral devices and for bridging in a network environment.

Although the patent shows, in FIG. 1, a bus to bus bridge including a buffer memory, the patent does not teach nor suggest a mechanism for improving bus load capability in bus to bus bridges which eliminates the need for multiple host and/or multiple PCI—PCI bridges, or the like.

None of the prior art teaches nor suggests a method for reducing the requirement for including multiple bridges for addressing fan-out (load) capability.

In particular, a specific problem exists when a system requires more secondary bus slots than normally allowed (such as a maximum of four slots for a PCI bus), and requires efficient peer to peer operations. The current solution in the industry for this problem is to provide additional host bridges, or provide multiple PCI—PCI bridges to generate the added slot capability beyond the typical four slot capacity of one host bridge. These conventional techniques attempt to solve the requirement of additional slots, but they do not address the need for efficient peer to peer support while minimizing the number of host and bus to bus bridges.

SUMMARY OF THE INVENTION

Therefore, it is an object of the present invention to efficiently handle multiple mixed transactions in both inbound and outbound directions in a host bridge. The present invention also includes a control mechanism for providing a dual secondary bus interface which provides increased fan-out (load) capability, and provides a basic internal bus to bus bridge capability which allows improved peer to peer support between the two secondary bus interfaces.

The present invention significantly expands the slot fanout capability of the secondary bus interface of the host bridge, by providing a dual host bridge which generates two secondary bus interfaces. For example, in the case of a PCI bus this will provide 20 bus loads under one PCI host bridge instead of the normal 10 loads.

The present invention also provides the appropriate internal control logic to treat the two secondary buses as one logical bus (from an arbitration viewpoint), and to provide peer—peer support across the two secondary PCI bus interfaces.

The present invention accomplishes these added features and benefits which are provided with no software impacts.

Further, the present invention includes simplifying by providing only one host bridge function in the upper portion of the dual host bridge (below the primary system bus interface), and creates the dual secondary bus interfaces with bus steering logic and other control functions.

These techniques can be applied to host bridges, and in general to bus to bus bridges that also post write and read transactions.

The foregoing has broadly outlined the features and technical advantages of the present invention in order that the detailed description of the invention which follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference will be made to the following description taken in conjunction with the accompanying drawing, in which.

DETAILED DESCRIPTION OF THE PREFERRED EMBODIMENTS

The present invention efficiently handles multiple mixed transactions in both inbound and outbound directions in a host bridge, and also includes a control mechanism for providing a dual secondary PCI interface which provides double the fan-out (load) capability, but also provides a basic internal PCI—PCI bridge capability which provides improved Peer—Peer support between the two secondary bus interfaces.

Accordingly, a data processing system includes a host processor(s), a number of peripheral devices, and one or more bridges which may connect between one or more host processors, peripheral devices and other host processors with interconnected peripheral devices such as in a network. A host bus to bus bridge connects between a primary bus (e.g. a system bus) and a dual secondary bus (e.g. an I/O bus, such as a PCI bus) wherein for the purpose of clarity, the primary bus will be considered as the source for outbound transactions and the destination for inbound transactions and the secondary buses will be considered the destination for outbound transactions and the source for inbound transactions. Different transactions on the primary bus may or may not occur simultaneous to other transactions on the secondary bus, depending on implementation. Each host bridge includes an outbound data path, an inbound data path, and a control mechanism. The outbound data path includes a queued buffer for storing transactions in order of receipt (or other ordering) from the primary bus where the requests in the queued buffer may be mixed as between read requests and write transactions, the outbound path also includes a number of other buffers for storing read reply data and address information.

The inbound path is a mirror image of the outbound path with read requests and write requests being stored in a transaction buffer and read replies being stored in a number of other buffers. Both the inbound path and the outbound path in the host bridge are controlled by a state machine which takes into consideration activity in both directions and permits or inhibits bypass transactions. Bypass herein means that a subsequent transaction may be allowed to be processed before a prior transaction, even though the prior transaction entered the queue earlier than the subsequent transaction.

The present invention allows inbound and outbound transactions to be handled in both sequential and non-sequential order under the control of a predetermined state machine based on a specific type of transaction and a defined set of ordering rules. Further, inbound and outbound transactions in a host bridge can be efficiently handled by a mechanism which allows read transactions to follow write transactions without requiring buffers to be flushed out.

The present invention maintains proper data consistency be maintained relative to the different transactions as they traverse a host bridge. Other transactions such as read requests must be completed (data fetched) on the destination bus prior to completing on the initiating bus. For example, a host processor may request data from a peripheral device on the I/O bus. The data must be fetched from the peripheral device on the destination bus and provided through the host bridge to the host processor on the initiating bus, before the transaction is considered complete. With the features of the present invention, processing of transactions such as a read access can progress without flushing posted writes.

A posted read herein means that the target device acknowledges the access and signals that it is busy and then terminates the access with a retry control signal. The master (requesting device) will try the access again later. The host bridge of the present invention then posts the read request for subsequent processing such that it may have the read data available when the master tries the access again later. If the master tries again before the host bridge obtains the requested data, the bridge again signals retry but does not buffer a second copy of the access request. For a host bridge, the read request from a processor(s) may be tagged and not require the processor to be retried.

In general, in accordance with the present invention the load operation (a read operation relative to a host processor) path and store (a write operation relative to a host processor) path should be independent of the direct memory access (DMA) path between peripheral devices and system memory for improved performance and ease of implementation. It should be noted that load and store operations will consider a flow of transactions wherein a load will cause data to be loaded into a host processor and a store will cause data to be stored in a peripheral device from a host processor.

Also, a load request to either the peripheral memory space or the peripheral I/O space (I/O output buffer) of a host bridge must never be passed to the I/O bus before a previous load to either the peripheral memory space (memory output buffer) or the peripheral I/O space of the same host bridge when both of the loads go to the same address. This allows improved performance (allows passing) when the addresses are different, but avoids the problem of one processor stealing another processors data (i.e. getting stale data) when one or both processors write to that same address.

Further, in accordance with the present invention, DMA read reply data will be allowed to bypass previous load and store transactions buffered in the host bridge to avoid deadlocks. This is a different requirement than for bus to bus bridges, and is required for proper interaction between a host bridge and the PCI bus in order to improve performance. Additionally, a load or store to either the peripheral memory space or the peripheral I/O space of a host bridge must never be passed to the I/O bus before a previous store to either the peripheral memory space or the peripheral I/O space of the same host bridge (i.e. multiple stores to the I/O bus generated by one host bridge must be kept in order and a load must not pass a store.

The present invention provides means to significantly expand the slot fanout capability of the secondary bus interface of the PCI host bridge, by providing a PCI Dual Host Bridge (see FIG. 4) which generates two PCI secondary bus interfaces. This will provide 20 bus loads under one PCI host bridge instead of the normal 10 loads. Appropriate internal control logic is provided to treat the two secondary PCI buses as one logical bus (from an arbitration viewpoint). Further, the present invention also provides the appropriate internal control logic to also provide peer to peer support across the two secondary PCI bus interfaces.

The aforementioned added features and benefits are provided with no software impacts.

The present invention also simplifies a system to include only one PCI host bridge function in the upper portion of the dual host bridge (below the primary system bus interface), and create the dual secondary PCI bus interfaces basically with bus steering logic and other control functions.

These techniques can be applied to host bridges, and in general to bus to bus bridges that also post write and read transactions.

Figure 1:
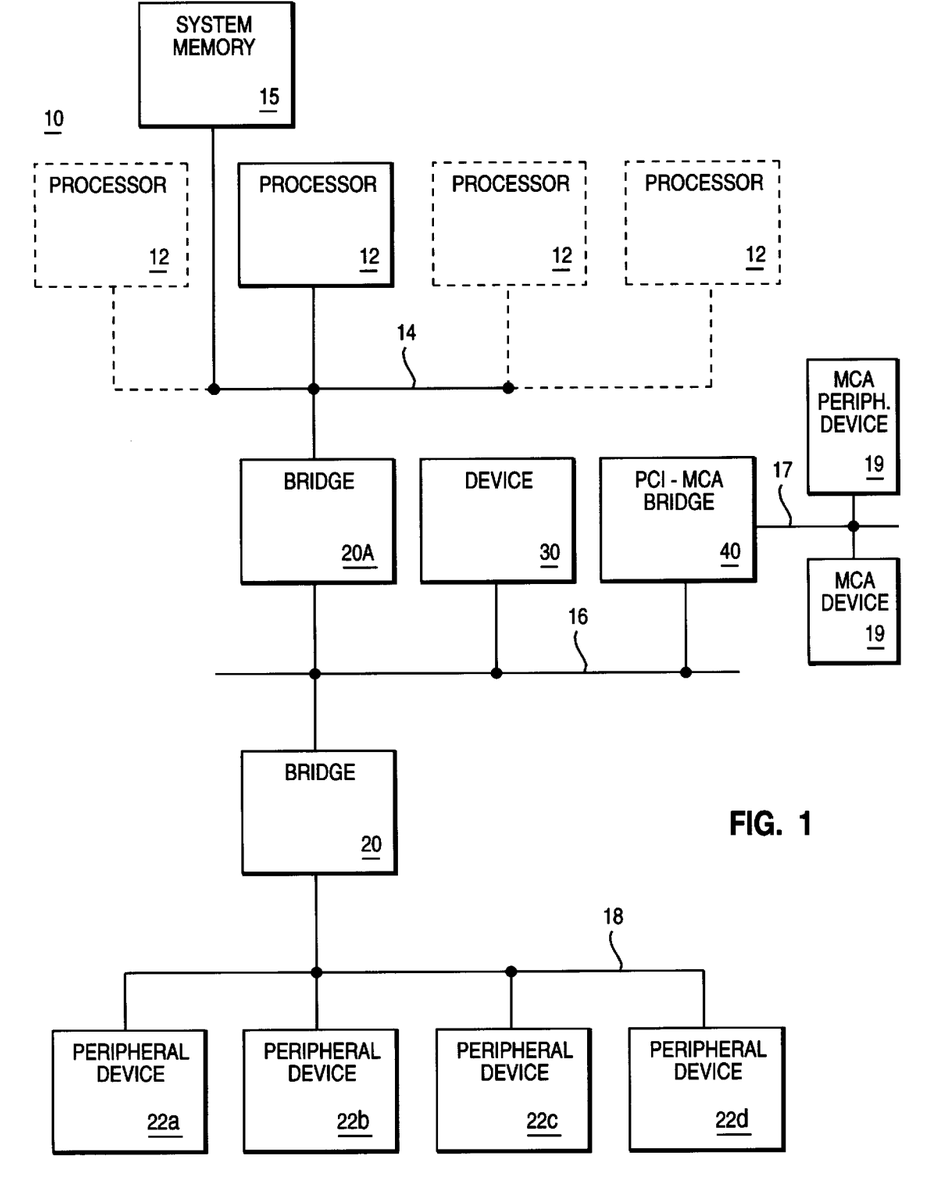
FIG. 1 is a block diagram of a data processing system embodying the present invention.

Referring now to FIG. 1, a data processing system embodying the present invention will be described.

System 10 includes at least one host processor 12 connected to a first bus 14, such as a system bus capable of being used by a multiprocessor system. Other processors 12 shown in dotted lines on FIG. 1 may also be connected to bus 14.

Also connected to system bus 14 is host bridge 20*a* which connects between first bus 14 and a second bus 16. System memory 15 is also connected to system bus 14. Other devices 30, 40 may be connected to bus 16 as well. By way of example and not limitation, device 40 may be another bridge chip for connecting a PCI bus (e.g. bus 16) with another I/O bus 17, such as the Microchannel bus (Microchannel is a trademark of IBM Corp.) available from IBM. Microchannel (MC) peripheral devices 19 are also shown connected to MC bus 17. Thus, MC devices are capable of communicating with components on the host system, such as memory 15, processors 12, and the like through PCI-MC bridge 40 and host bridge 20*a*. Although MC is used herein as an example, it should be noted that the scope of the present invention contemplates other types of bridge chips 40 and peripheral devices 19 for use with I/O buses, such as ISA, ESA, VME, or the like. Additionally, another bridge 20 is connected to bus 16 and to a third bus 18. Also connected to bus 18 may be a number of stations or peripheral devices 22*a*, 22*b*, 22*c* and 22*d*. In a preferred embodiment bridge 20 is a bus to bus bridge which connects buses having identical protocols, i.e. buses 16 and 18 are both PCI buses.

As an example, but not a limitation to the scope of the invention, buses 16 and 18 each may be a PCI bus which has become an industry standard.

Figure 4:
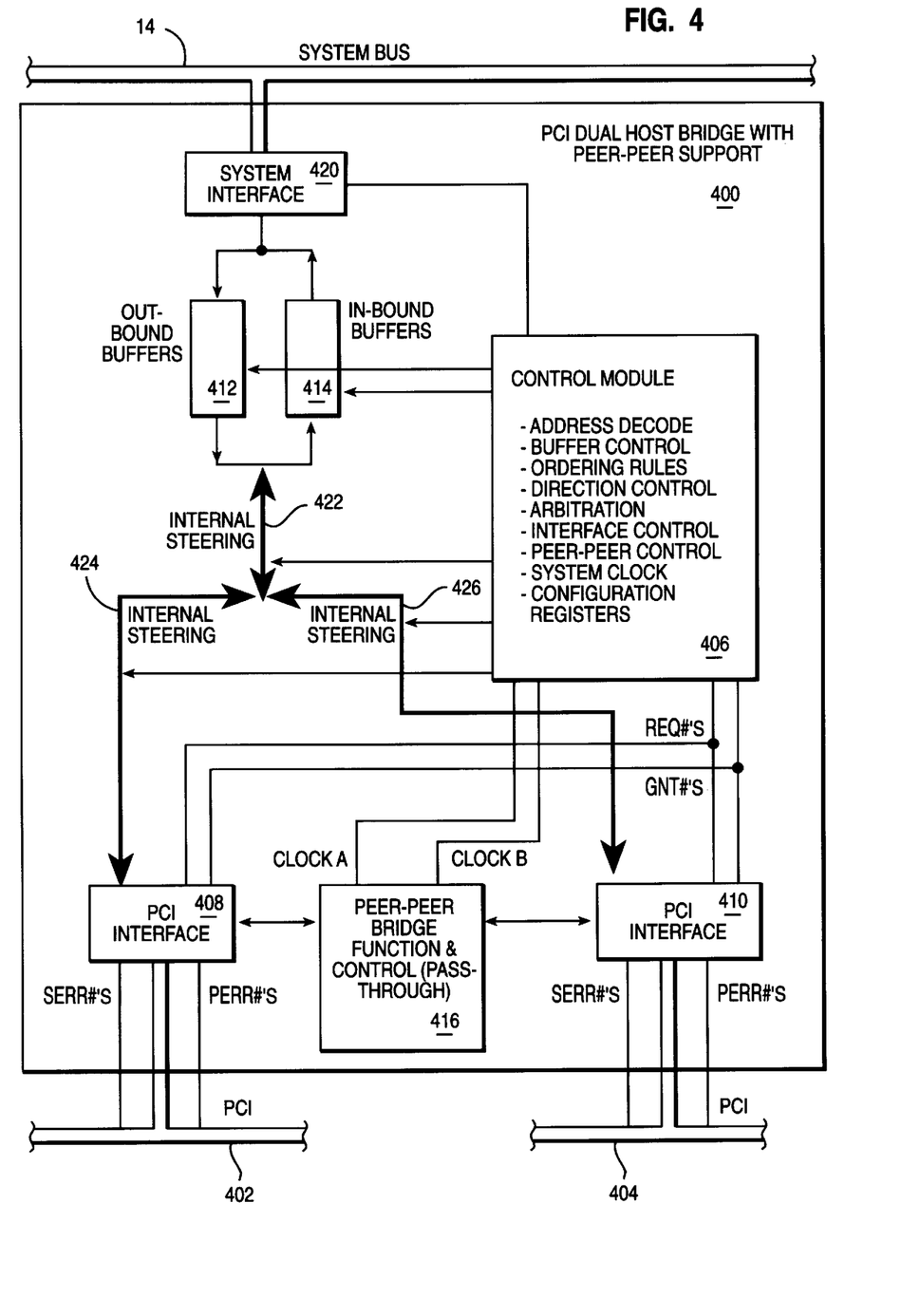
FIG. 4 is another block diagram showing an expanded view of the host bridge which also includes the set of steering logic and other control devices which provide the dual secondary I/O bus interfaces and peer to peer support provided by the present invention.
Figure 5:
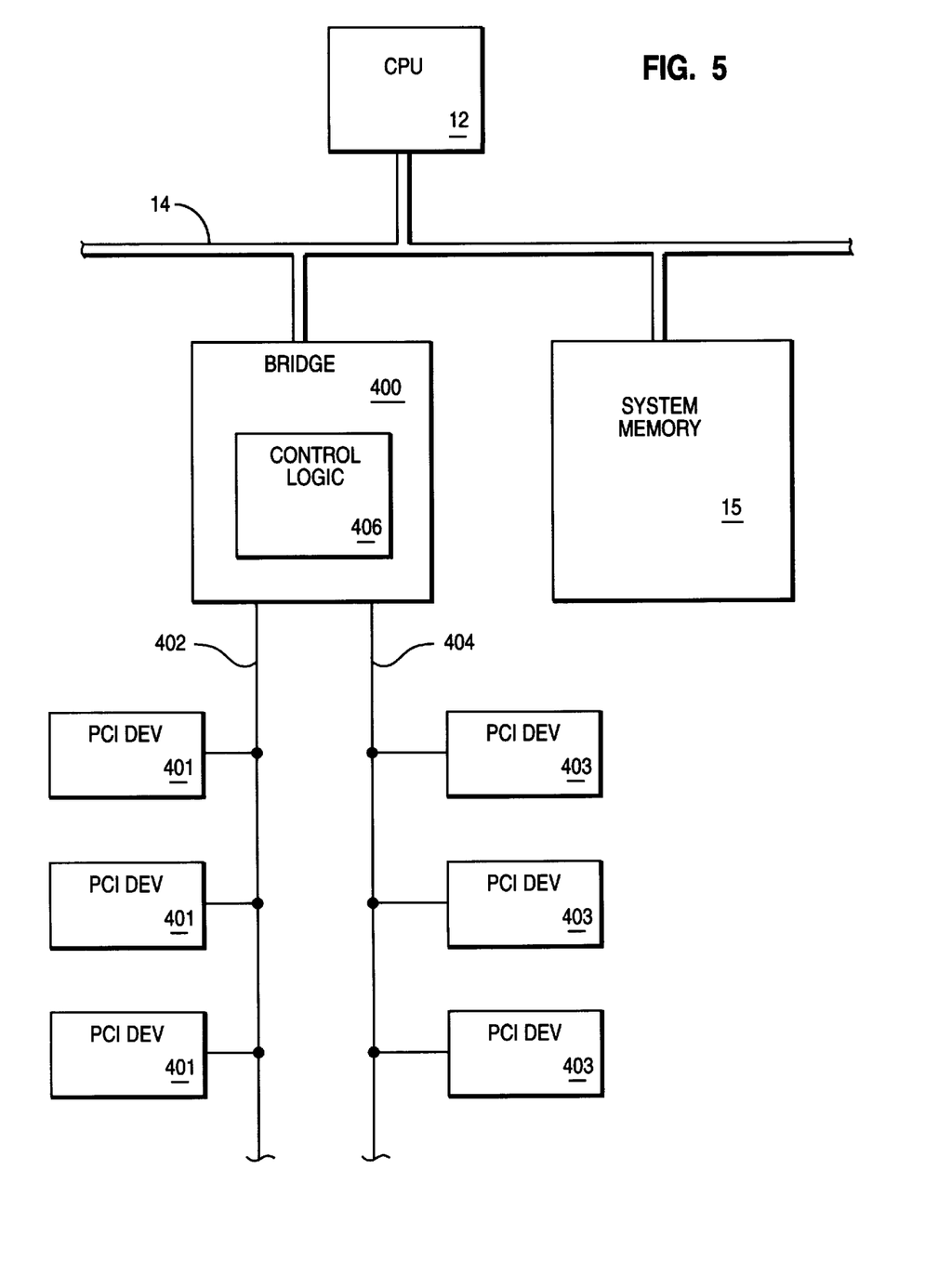
FIG. 5 is a block diagram showing another preferred embodiment of the present invention wherein a single host bridge supports multiple secondary buses.

FIG. 5 is a block diagram that more specifically shows the configuration of the present invention. Again, at least one CPU 12 is connected to system memory 15 by system bus 14. A dual host bridge 400 is also connected to system bus 14 (see FIG. 4). Bridge 400 includes control logic 406 which provides the function (such as transparent peer to peer support and transaction steering) to allow two secondary buses 402 and 404 to be controlled by bridge 400. I/O devices 401 and 403 are connected to buses 402 and 404, respectively. In a preferred embodiment, secondary buses 402 and 404 are PCI buses. As noted previously, the number of devices (either slots or soldered components) which can be connected to conventional PCI buses is limited. The present invention allows distinct buses 402 and 404 to be treated as a single logical bus (from an arbitration viewpoint) in order to increase the number of peripheral devices which can be supported by a single host bridge 400.

Figure 2:
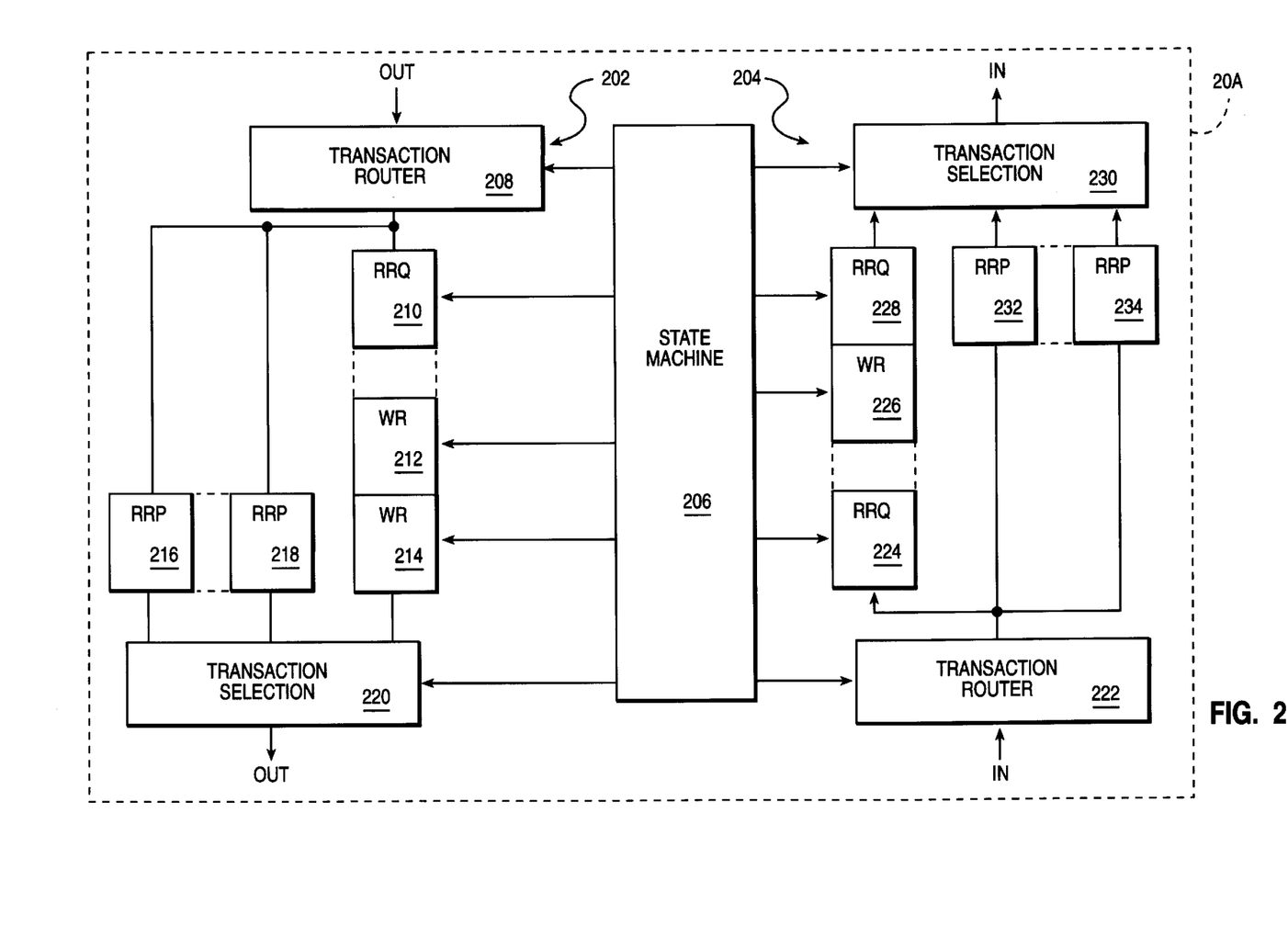
FIG. 2 is a block diagram of a host bridge (such as a PCI host bridge) illustrating the basic host bridge features utilized by the present invention in accordance with the system of FIG. 1.

Referring now to FIG. 2, host bridge 20*a* will be described in greater detail. As used in this description of the preferred embodiment of the invention, the term outbound refers to those transactions which are away from the processor 12 and inbound refers to those transactions which are toward the processor 12.

Bridge 20*a* has two data paths, outbound path 202 and inbound path 204. All transactions inbound and outbound are controlled by state machine 206.

When an outbound transaction is received by transaction router 208, the transaction format is examined to determine whether the transaction is a read request (request for data), a read reply (a response to a read request that provides data), or a write request (a request to place data in a specific device).

A read request has a format of an address and control information. A read reply has a format which includes an address, control information and the data which had been requested and which is now being sent to the original requester.

A write transaction, such as a posted memory write (PMW) or I/O write (I/O WR) includes an address, control information and the data which will be written into the selected address.

Assuming, for example, that the transaction currently active in transaction router 208 is a read request, the transaction will be forwarded to one of a number of sequential buffers 210, 212, 214. The sequential buffer entries 210, 212, 214 may be any appropriate number of buffer entries in length adequate to handle the stack of transactions anticipated to be pending in bridge 20a. Also, if the transaction is a write transaction, such as an I/O write or posted memory write, the transaction will be forwarded to one of the sequential buffers 210, 212, 214.

If the transaction pending in transaction router 208 is a read reply (RRP), the read reply transaction is transmitted to one of parallel buffer entries 216, 218.

At any time, the transaction to be selected and passed to a secondary bus by transaction selection circuit 220 is controlled by state machine 206. This allows, for example, out of sequence accesses to transactions stored in sequential buffers 210, 212 or 214 or to a read reply transaction in parallel buffers 216, 218.

The inbound path 204 includes the same elements as outbound path 202 except the elements are connected in the reverse order. That is, transaction router 222 is connected to the secondary bus 16 (see FIG. 1). As explained above with reference to outbound transaction router 208, inbound transaction router 222 is controlled by state machine 206. Each transaction is routed to one of the sequential inbound buffers 224, 226, and 228 for read request (RRQ) and write transactions (I/O write and PMW). Read reply transactions are transmitted to parallel buffers 232, 234. Inbound selection circuit 230 under the control of state machine 206 controls transmission of transactions from either sequential buffers 224, 226 or 228 or from parallel buffers 232 or 234 respectively.

Figure 3A:
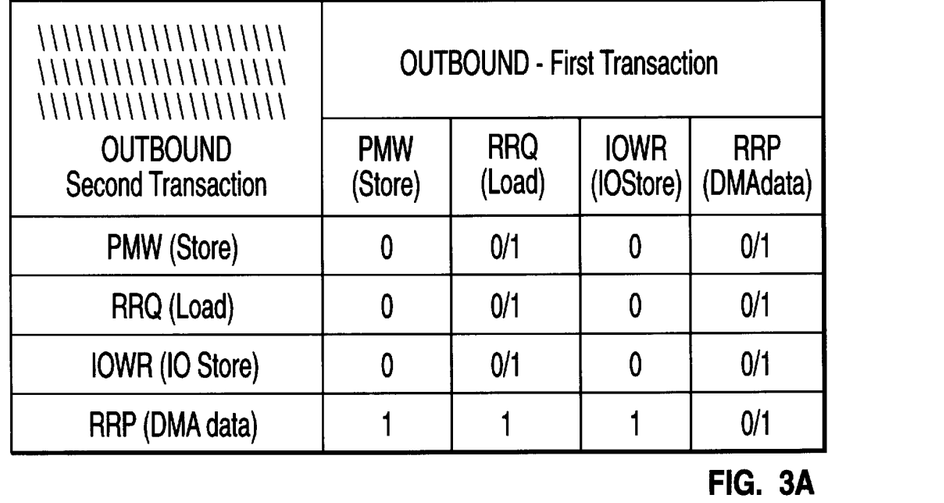
FIGS. 3a and 3b are logic tables showing control of transactions in the host bridge of FIG. 2 for each type of transaction on both the outbound and the inbound path.
Figure 3B:
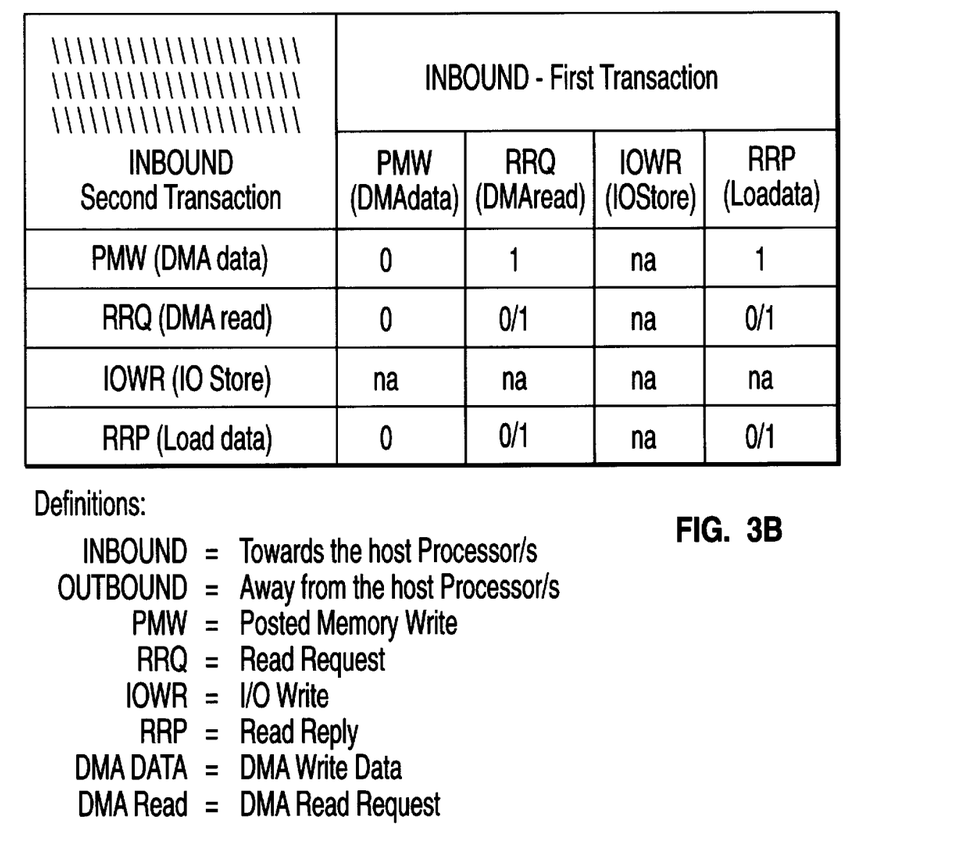

State machine 206 operates under a protocol which is defined by the state machine logic table shown in FIGS. 3a and 3b to control multiple transactions flowing either outbound or inbound or both.

Referring now to FIGS. 3a and 3b, the logic table which controls state machine 206 will be described. Across the top of logic table 3a are transactions which represent outbound transactions, and which will be referred to for convenience as a first transaction. Along the left side of logic table 3a are the outbound transactions which will be referred to for convenience as second transactions. Similarly, across the top of logic table 3b are transactions which represent inbound transactions, and will be referred to for convenience as a first transaction. Along the left side of logic table 3b are the inbound transactions which will be referred to for convenience as second transactions.

Note that for the entries in the tables of FIGS. 3a and 3b, a "0" entry means that a subsequent (second) transaction must not be allowed to bypass an earlier (first) transaction. A "1" entry means that a subsequent transaction must be allowed to enter the bridge, if necessary to bypass an earlier transaction for the transaction to progress, otherwise a deadlock can occur. A "0/1" entry means that a subsequent transaction may be allowed to bypass an earlier transaction, but is not required to do so (no ordering requirements—a don't care, and can be implementation specific based on performance and implementation cost considerations). That is, a "0/1" may allow bypassing in some cases, but not others, depending on the particular situation or implementation.

DMA read reply data must be allowed to bypass previous load and store transactions buffered in the host bridge to avoid deadlocks. This is a different requirement than for bus to bus (e.g. PCI—PCI) bridges, and is required for proper interaction between a host bridge and the PCI bus. This also can improve performance.

If, for example, there is an outbound first transaction which is a read request (RRQ), and an outbound second transaction which is a read reply (RRP), the intersection of the column and row in the logic table of FIG. 3a shows a one (1). A one in any position in the logic table indicates a subsequent transaction must be allowed to bypass this previous transaction. Thus, the read reply (RRP) with DMA data must be allowed to bypass the read request. Also, it can be seen that a RRP must be allowed to bypass a write operation, such as a PMW or I/O write. By allowing DMA data (RRP) operations to bypass processor load and store operations, the previously discussed problem which may cause a deadlock condition is eliminated. Assume for the purposes of example, that MC device 19 is requesting data from system memory 15 by a DMA request. Thus, a RRQ transaction is placed in one of sequential buffers 224, 226, 228 (since this is an inbound operation). In this case, the RRQ is assumed to be in buffer 228. Prior to the DMA data being returned from system memory 15, processor 12 initiates a write operation to MC device 19. Thus, for example, an I/O write transaction is placed in one of sequential buffers 210, 212, 214 (since this is an outbound transaction). In this case, assume the I/O write is placed in buffer 214. Subsequently, system memory 15 places the RRP, responsive to the RRQ from MC device 19 (including the requested DMA data) in one of parallel buffers 216 or 218, e.g. buffer 216. As noted earlier, the protocol of some I/O devices, such as MC device 19 require them to maintain control of bus 17 until each transaction is completed. Thus, a potential deadlock condition exists, since the I/O write operation in buffer 214 cannot complete, because MC device 19 is waiting on the DMA data in parallel buffer 216. The present invention prevents this deadlock condition from occurring by allowing the RRP transaction (including DMA data) in buffer 216 to bypass the I/O write transaction in buffer 214 and complete the DMA request by MC device 19. Of course, the present invention will also prevent other deadlock conditions from occurring, such as when a PMW or RRQ transaction may be in sequential buffer 214 in conflict with a RRP in buffer 216.

A zero in any position of the logic tables of FIGS. 3a and 3b indicate a prohibited bypass transaction. Thus, an outbound write operation as a first transaction, followed by an outbound read request as a second transaction, is not permitted to be bypassed by the second transaction. As used herein the term "bypass" means to complete on the destination bus a second request prior to completion of a first request. However, if the first transaction is, for example, an outbound write transaction, bypass of an outbound read reply transaction must be allowed.

It should be noted that all positions in logic tables 3a and 3b where there is a zero (0) indicating a prohibited bypass transaction involve write transactions. For example, an outbound read request as a second transaction cannot bypass an outbound write as a first transaction. From FIG. 3b, it can be seen that for inbound transactions, the same principles apply. Thus, an inbound read request (RRQ), read reply (RRP) or write transaction (PMW) may not bypass an earlier inbound write (PMW) as the first transaction, as shown in FIG. 3b. The logic tables 3a and 3b which control the operation of state machine 206 controls the gating of transactions in transaction routers 208 and 222 and transaction selection circuits 220 and 230, respectively. Those skilled in the art will understand how the logic represented in tables 3a and 3b can be implemented in control logic circuitry and included within state machine 206.

In the case of the preferred embodiment where a PCI Host Bridge (PHB) connects a PCI bus, as an I/O bus, with a system bus in a computer system using a microprocessor having unique characteristics, such as the PowerPC 604 microprocessor (PowerPC and PowerPC 604 are trademarks of IBM Corp.) available from IBM Corp., there are several considerations which must be addressed. In general, the load (RRQ) and store (PMW, I/O WR) paths relative to the processor 12 should be independent of the DMA path (e.g. RRP) relative to peripheral device for improved performance and ease of implementation. Also, for the "0/1" entries in the tables of FIGS. 3a and 3b, these transactions may bypass but are not required to bypass. Whether to bypass or not may be based on any fairness rule, performance consideration, or ease of implementation (except for the case which will be described in the following paragraph).

For a PCI host bridge, a load (such as a RRQ transaction) to either the peripheral memory space or the peripheral I/O space of the host bridge must never be passed to the I/O bus before a previous load to either the peripheral memory space or the peripheral I/O space of the same host bridge when both of those loads go to the exact same address. From FIG. 3a, it can be seen that a "0/1" is present at the intersection of the RRQ (load) operation as a first transaction and a RRQ (load) operation as a second transaction. In this case, bypassing is allowed, i.e. for the case where the targeted addresses are not the same. However, if a comparator contained in state machine 206 determines that the addresses are the same, then the second RRQ transaction cannot bypass the first RRQ transaction. Thus, a "0/1" (in this case) indicates that bypassing of the first transaction by the second transaction may occur, depending on additional factors, e.g. dependent on the outcome of the address comparison. This allows improved performance (allows passing) when the addresses are different, but avoids the problem of one device stealing another device's data (getting stale data) when one or both devices are accessing data at the same address. If these transactions have different addresses, they may bypass. This allows for improved performance when the addresses are different, but avoids the problem of one device stealing another devices's read data (getting stale data) when one or both devices's write to the same address, because, the devices are accessing data at different addresses and there is no conflict.

Those skilled in the art will also understand how state machine 206 may include a comparator to determine if the addresses targeted by the requesting devices (e.g. processors 12) are identical. Other considerations include the case where a load or store to either the peripheral memory space or the peripheral I/O space of a PHB must never be passed to the I/O bus before a previous store to either the peripheral memory space or the peripheral I/O space of that same PHB (that is, multiple stores to the I/O bus generated by one PHB must be kept in order and a load must not pass a store. For example, it can be seen from FIG. 3a that a load (RRQ) as the second transaction cannot pass a store (PMW or I/O WR), since a "0" is present at the intersection of these transactions. Further, a store as a second transaction (e.g. PMW) cannot pass another store as a first transaction (PMW or I/O WR) as seen from the "0" at the intersection of these transaction in FIG. 3a.

Note that all subsequent inbound transactions must not be allowed to bypass earlier inbound posted memory writes (PMW). FIG. 3b, shows a "0" in the intersection between all the second transactions (except I/O WR because it is not applicable) and a PMW as the first transaction. Also, subsequent inbound posted memory writes (PMW) as a second transaction must be allowed to bypass earlier read requests (RRQ) and read replies (RRP) as first transactions, as shown by the "1" in the intersection of these transactions in FIG. 3b.

Note also that there are no tables which address outbound versus inbound transactions, and inbound versus outbound transactions. In these cases, since the transactions are travelling in opposite directions and are going to different address spaces, these transactions should be independent and have no ordering requirements relative to each other. For cases where any outbound versus any inbound transaction or any inbound versus any outbound transaction requires ordering, it is handled by software protocols beyond the scope of this invention.

It should be noted that some table entries in FIG. 3b are "na". These cases are "not applicable" since an inbound I/O WR transaction is not defined in a the preferred embodiment which address the case of a system which utilizes a PowerPC microprocessor.

Other than the considerations listed above and considerations in the cross referenced IBM patent applications, hereby incorporated by reference, the transaction ordering requirements for a PCI Host Bridge in a system using a microprocessor, such as a PowerPC microprocessor, are the same as for PCI—PCI bridges (see the PCI Local Bus Specification, version 2.1).

A master that attempts a read access and is retried, must periodically try the access again until it completes.

Referring now to FIG. 4, the dual PCI host bridge 400 of the present invention having a capability which includes providing two (2) secondary PCI bus interfaces 408, 410 and improved peer—peer support will be described.

The PCI Local Bus Specification defines the electrical characteristics of a PCI bus. With the assumed capacitive loading in the PCI electrical definition, allowed timing budget, and bus timing definitions, a worst case bus loading of 10 loads is allowed. This invention allows significantly expanding the slot fanout capability of the PCI bus by providing PCI Dual Host Bridge 400 (see FIG. 4) which is connected to system bus 14 by system interface 420 and exchanges control information such as data, address information and the like based on the various bus protocol being implemented. Bridge 400 generates two PCI bus interfaces 408 and 410 allowing 20 bus loads in total on the PCI bus interfaces 408, 410 (up to 8 slots total). By also providing the appropriate internal control logic, this dual bus chip can treat the two PCI buses 402, 404 as one logical bus, and also provide peer to peer support across both of these buses.

FIG. 4 illustrates the capability described in this invention. PCI dual host bridge 400 is shown which generates two secondary PCI buses 402, 404. The internal data paths within this dual bus chip are controlled by direction control logic (within control logic 406) to steer transactions between PCI secondary interfaces 408, 410 and a central host bridge core set of controls, embodied in control module 406, that result in the dual chip functioning basically as "one" host bridge, with one set of host bridge outBound and inbound transaction buffers 412, 414. Control logic 406 provides the necessary controls for address decode, buffer control, transaction ordering rules, direction control (steering), arbitration, interface control, peer—peer control, and a system clock, as well as configuration registers needed for configuration and to determine when a transaction is considered peer to peer.

Also shown in FIG. 4 is a peer to peer bridge function control logic circuit 416. This provides a simple pass-through (no buffering) PCI—PCI bridge function within the dual bus chip 400 for support of peer to peer operations between the two secondary PCI buses 402, 404. One arbiter, included in control logic 406, can be used to control both secondary PCI buses 402, 404, resulting in the two PCI buses operating as one logical bus from an arbitration viewpoint, though they are two physical and logical buses from a configuration viewpoint. To make the two buses 402, 404 look as two separate logical and physical buses, the host bridge provides two separate sets of host bridge configuration registers, included in control logic 406. However, dual host bridge 400 will have a common set of buffers for data and transactions traversing the bridge which will serve as one overall host bridge.

The outbound buffers 412 and inbound buffers 414 are managed by control logic 406, based on the appropriate combination of transaction ordering requirements of the systems coherency rules (FIG. 2) plus PCI bus ordering requirements. By keeping the peer to peer bridge function and control logic 416 as a simple pass-through function working in concert with the arbiter in logic 406, this function can be kept below the systems coherency domain, and will allow it to support peer to peer operations between the two physical PCI secondary buses 402 and 404.

The direction control in control logic 406 is needed to steer information onto the appropriate internal data paths 422, 424, 426 in the correct direction, based on the location of the controlling master device that wins the last arbitration cycle. When the transaction is outbound from the processor on internal bus 422, the transaction control information can simply be placed on internal buses 424 and 426 and provided to both PCI buses (acting as one logical bus) by providing the information to both PCI interfaces 408, 410, via internal buses 424, 426, respectively. Further, the transaction can be steered to the appropriate PCI bus 402 or 404 based on address of the target device. If the transaction is steered onto both buses 402 and 404, then the device select (DEVSEL#) signal for the bus which did not actually include the targeted device (e.g. 404) would need to be redriven out on that bus 404 to avoid a subtractive decode on bus 404 from responding to the transaction control information. This would require the subtractive decode to be set for the longest time possible. This DEVSEL# signal is a PCI bus operation signal which is driven by the target of the current transaction to indicate that it is responding to the transaction. In order to operate as one logical bus, both buses 402 and 404 need to issue the DEVSEL# signal when either bus contains the targeted device. Inbound transactions from one physical PCI bus on internal buses 424 or 426 to the system will only get routed to system bus 14, via internal bus 422 and do not get routed to the outbound path toward the other physical PCI bus. For example, an inbound PCI transaction from bus 404 will be routed to the system via bus 426 and 422, but will not be provided to PCI bus 402 via internal bus 424. PCI peer to peer transactions are detected based on address. If the I/O device address falls into the range of addresses designated as being below the host bridge (i.e., is in the range of one of the two sets of host bridge configuration registers included in control logic 406 that indicate which addresses are below the host bridges), then this is a peer to peer function. It should be noted that an address in the range of addresses below the host bridge indicates that the address corresponds to one of the peripheral devices connected to an I/O bus controlled by dual host bridge 400. In the case shown in FIG. 4, a target device connected to either bus 402 or 404 will have an address considered to be below the host bridge. If the operation is a peer to peer operation and the address is in the range of the configuration registers for the particular bridge including the device implementing the transaction, then the operation is totally ignored by the host bridge chip, e.g. the master device and targeted device are both on bus 404. If the operation is a peer to peer operation and the target device is under the other bridge of the dual host bridge (as indicated by the other bridges configuration registers), then the control will gate on the peer to peer bridge pass through function as embodied in pass through logic 416. For example, if the master device is connected to bus 404 and the target device is connected to bus 402, then both addresses will be "below the host bridge", such that the transaction is peer to peer, and, the pass through control function will be invoked since the master and targeted devices are on different PCI buses. This is possible since two sets of host bridge configuration registers are provided by control logic 406. This type of peer to peer transaction between different physical PCI buses will be ignored by the system since the address was not for the system (i.e. the address was "below" the host).

The interface controls 408 and 410 for buses 402 and 404, respectively, may also include separate SERR# and PERR# signals (as defined in the PCI Bus Specification), as well as other control signals that can provide enhanced error recovery capability and allow quiescing of a physical bus for hot plug control.

Although the present invention and its advantages have been described in detail, it should be understood that various changes, substitutions and alterations can be made herein without departing from the spirit or scope of the invention as defined in the appended claims.

What is claimed is:

1. A data processing system, comprising:
   a system bus coupled to at least one processor;
   first and second secondary buses each for supporting a predetermined number of peripheral devices;
   a bridge, connected to said system bus and said first and second secondary buses, for coupling said first secondary bus and said second secondary bus to create one logical bus supporting a number of said peripheral devices greater than said predetermined number, said bridge including steering logic for communicating transactions between said system bus and said first secondary bus and said second secondary bus; and
   a transaction data buffer commonly utilized by all of said system bus, said first secondary bus and said second secondary bus.

2. A system according to claim 1, wherein said bridge comprises means for controlling transactions between said first and second secondary buses, and between said first and second secondary buses and said system bus.

3. A system according to claim 2, wherein said means for controlling comprises means for determining a location of participants in said transaction, including said peripheral devices and said processor on said first secondary bus, said second secondary bus or said system bus.

4. A system according to claim 3, wherein said bridge further comprises means for providing transparent transaction processing between one of said peripheral devices connected to said first secondary bus and another of said peripheral devices connected to said second secondary bus.

5. A system according to claim 4, wherein said means for providing comprises means for transferring transaction information from said first secondary bus to said second secondary bus when one of said participants in said transaction is determined to be on said first secondary bus and the other of said participants is determined to be on said second secondary bus.

6. A system according to claim 5 wherein said means for controlling further comprises means for steering said transaction information between said first and second secondary buses and said system bus.

7. A system according to claim 6 wherein said means for steering comprises:
   means for supplying said transaction information to both said first and second secondary buses when an originator of said transaction information is on said system bus;
   means for supplying said transaction information only to said system bus when the originator of said transaction information is on either of said first or second secondary buses, and a targeted one of said participants is on said system bus; and
   means for supplying said transaction information to only one of said first or second secondary buses when said targeted one of said participants is on one of said first or second secondary buses and said originator is on the other of said first or second secondary buses, respectively.

8. A system according to claim 7 wherein said means for supplying said transaction information to only one of said first or second secondary buses when said targeted one of said participants is on one of said first or second secondary buses is based upon an address of said targeted participant.

9. A system according to claim 8 wherein said means for determining comprises:
   a plurality of configuration registers for storing an address of the participants in said transaction; and
   means for decoding said address to determine a location of said participants on said first secondary bus, said secondary bus or said system bus.

10. A method of interconnecting a plurality of buses in a data processing system, comprising the steps of:
    connecting at least one processor to a system bus;
    providing first and second secondary buses each for supporting a predetermined number of peripheral devices; and
    connecting a bridge to said system bus and said first and second secondary buses and coupling said first secondary bus and said second secondary bus to create one logical bus supporting a number of said peripheral devices greater than said predetermined number, said bridge including steering logic for communicating transactions between said system bus and said first secondary bus and said second secondary bus; and
    utilizing a common transaction data buffer by all of said system bus, said first secondary bus and said second secondary bus.

11. A method according to claim 10, wherein said step of connecting further comprises the step of controlling transactions between said first and second secondary buses, and between said first and second secondary buses and said system bus.

12. A method according to claim 11, wherein said step of controlling comprises the step of determining a location of participants in said transaction, including said peripheral devices and said processor on said first secondary bus, said second secondary bus or said system bus.

13. A method according to claim 12, wherein said step of connecting further comprises the step of providing transparent transaction processing between one of said peripheral devices connected to said first secondary bus and another of said peripheral devices connected to said second secondary bus.

14. A method according to claim 13, wherein said step of providing comprises the step of transferring transaction information from said first secondary bus to said second secondary bus when one of said participants in said transaction is determined to be on said first secondary bus and the other of said participants is determined to be on said second secondary bus.

15. A method according to claim 14 wherein said step of controlling further comprises the step of steering said transaction information between said first and second secondary buses and said system bus.

16. A method according to claim 15 wherein said step of steering comprises the steps of:
    supplying said transaction information to both said first and second secondary buses when an originator of said transaction information is on said system bus;
    supplying said transaction information only to said system bus when the originator of said transaction information is on either of said first or second secondary buses, and a targeted one of said participants is on said system bus; and
    supplying said transaction information to only one of said first or second secondary buses when said targeted one of said participants is on one of said first or second secondary buses and said originator is on the other of said first or second secondary buses, respectively.

17. A method according to claim 16 wherein said step of supplying said transaction information to only one of said first or second secondary buses when said targeted one of said participants is on one of said first or second secondary buses is based upon an address of said targeted participant.

18. A method according to claim 17 wherein said step of determining comprises the steps of:
    providing a plurality of configuration registers for storing an address of the participants in said transaction; and
    decoding said address to determine a location of said participants on said first secondary bus, said secondary bus or said system bus.

* * * * *